United States Patent [19]

Seltmann et al.

[11] Patent Number: 4,918,119
[45] Date of Patent: Apr. 17, 1990

[54] ADHESIVE CONTAINING ISOCYANATE-TERMINATED POLYURETHANE PREPOLYMER AND EPOXY RESIN

[75] Inventors: Hans-Guenter Seltmann, Duesseldorf; Hans-Josef Hoffmann, Kempen; Hartmut Lippert, Monheim, all of Fed. Rep. of Germany

[73] Assignee: Henkel Kommanditgesellschaft auf Aktien, Duesseldorf-Holthausen, Fed. Rep. of Germany

[21] Appl. No.: 230,639

[22] Filed: Aug. 10, 1988

[30] Foreign Application Priority Data

Aug. 10, 1987 [DE] Fed. Rep. of Germany ....... 3726555

[51] Int. Cl.$^4$ .................... C08K 5/16; C08L 63/02
[52] U.S. Cl. ................................ 523/461; 525/528
[58] Field of Search ................ 525/528; 523/461

[56] References Cited

U.S. PATENT DOCUMENTS

| | | | |
|---|---|---|---|
| 3,425,886 | 2/1969 | Heins | 525/528 |
| 3,737,406 | 6/1973 | D'Alelio | 525/528 |
| 3,912,566 | 10/1975 | Andrews et al. | 525/528 |
| 3,931,088 | 1/1976 | Sakurada et al. | 524/563 |
| 4,535,121 | 8/1985 | Özelli et al. | 524/715 |
| 4,623,702 | 11/1986 | Grieves et al. | 525/528 |
| 4,734,307 | 3/1988 | Thorsrud | 428/95 |

OTHER PUBLICATIONS

Epoxide Resins; W. G. Potter, pp. 12–35.
Encyclopedia of Chemical Technology, 3rd Edition, vol. 5, p. 2.
Industrial Oil and Fat Products, 1951, Alton Bailey, pp. 41 and 187.

*Primary Examiner*—Lewis T. Jacobs
*Assistant Examiner*—Robert E. Sellers, II
*Attorney, Agent, or Firm*—Ernest G. Szoke; Wayne C. Jaeschke; Norvell E. Wisdom, Jr.

[57] ABSTRACT

A moisture-hardening flocking adhesive composition for application to elastomers. The adhesive contains an isocyanate terminated polyurethane prepolymer, an aromatic dinitroso compound and an essentially hydroxyl-free epoxy resin having an epoxide value of from about 0.45 to about 0.75. The composition is essentially free of highly volatile organic solvents. The composition is characterized as having improved storage stability and provides excellent adhesion between elastomeric substrates and flocking fibers, even after exposure to water.

17 Claims, No Drawings

ADHESIVE CONTAINING ISOCYANATE-TERMINATED POLYURETHANE PREPOLYMER AND EPOXY RESIN

BACKGROUND OF THE INVENTION

1. Field of the Invention

This invention relates to moisture-hardening flocking adhesive systems which are solvent free and which may be used in the production of flexible elastomeric articles provided with a coating of fibers.

2. Description of the Prior Art

It is known that the surface of elastomers or other plastic surfaces can be treated with an adhesive solution followed by the application of short-staple fibers vertically to the surface in an electrical field after evaporation of the solvent. Such flocked articles have fabric-like surface with minimal friction with other materials such as glass. Profiles made from such materials may be used in applications such as sealing strips in window channels of automobiles. Other applications include flocked mats, flocked flexible shafts, flocked floor coverings, flocked rubber gloves, sticker boards for demonstration purposes, flocked clearer rollers for the spinning machine industry, textile tubes and the like.

The flocking adhesives commonly used for the production of flocked materials are commercial polyurethane adhesives based on a mixture of 2 isocyanate-terminated prepolymers. Typical formulations contain 40% by weight polyurethane prepolymer and 60% by weight of a readily volatile solvent. Dilution in the solvent gives a sufficiently low application viscosity so that the adhesive can be applied by casting, by roller or by spraying. The most common solvents used include xylene, toluene, ketone mixtures or chlorinated hydrocarbons. The solvent must be quickly volatilized so that there is no risk of explosion in the case of foamable solvents where flocking is carried out by high-voltage electrical fields in a flocking cubicle. The volatilized solvents have to be removed in accordance with environmental standards.

Typical examples of such solvent-containing flocking adhesives are disclosed in U.S. Pat. No. 4,535,121. These adhesives contain polyurethane prepolymers based on diisocyanates and polyols, aromatic dinitroso compounds as adhesion promoters, polyfunctional reaction products of isocyanates and epoxide compounds, low-boiling alkylbenzene solvents such as toluene or xylene, as well as conventional additives such as fillers, pigments and/or stabilizers. The reaction products of isocyanates and epoxide compounds are produced in the absence of water using reaction catalysts which bring about a direct reaction between the epoxide groups and the isocyanate groups. Examples of such catalysts are alkali phenolates, acetates, lactates, naphthenates and alcoholates and also alkali salts of fatty acids such as lithium stearate. These reaction products contain no epoxide groups.

DESCRIPTION OF THE INVENTION

Other than in the operating examples, or where otherwise indicated, all numbers expressing quantities of ingredients or reaction conditions used herein are to be understood as modified in all instances by the term "about".

The present invention is directed to moisture-hardening, solvent-free flocking adhesive compositions for polymeric substrates, particularly apolar elastomer substrates including EPDM, CM and CR elastomers, which compositions are not attended by the above-mentioned disadvantages arising out of the presence of solvents and which also exhibit improved water resistance.

In its broader aspect, this invention provides an adhesive composition based on:

(a) at least one isocyanate-terminated polyurethane prepolymer;

(b) at least one aromatic dinitroso compound present in an amount sufficient to promote adhesion of the composition to an elastomeric substrate, and (c) at least one essentially hydroxyl-free epoxy resin having an epoxide value of from about 0.45 to about 0.75.

The preferred moisture-hardening flocking adhesive composition of this invention contains:

(a) 80 to 96 parts by weight of a polyurethane prepolymer which is the reaction product of at least one diisocyanate selected from the group consisting of diphenylmethane diisocyanate, hydrogenated diphenylmethane diisocyanate, tolyene diisocyanate and hexamethylene diisocyanate, with a mixture of difunctional polyols, one of said polyols having a number average molecular weight of 400 to 1000, and another of said polyols having a molecular weight of greater than 1000 up to 4000, the NCO:OH molar ratio being 6:1 to 8:1 and the viscosity of said prepolymer being in the range of from 600 to 900 MPa.s at 20° C.;

(b) 1 to 5 parts by weight of at least one aromatic dinitroso compound;

(c) 3 to 10 parts by weight of at least one hydroxyl-free epoxy resin having an epoxide value of 0.45 to 0.75 and selected from the group consisting of reaction products of epichlorihydrin with novolaks or bisphenols;

(d) and, optionally, 1 to 20 parts by weight of at least one alkylbenzene corresponding to the general formula:

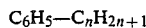

$$C_6H_5-C_nH_{2n+1}$$

wherein n is an integer having a value of 8 to 16.

The adhesive composition is further characterized as being free from catalysts which catalyze the reaction of NCO groups with epoxide groups to form oxazolidone groups.

The epoxy resins suitable for use in accordance with the invention are essentially hydroxyl-free, i.e., they have hydroxyl values of less than 0.01.

The moisture-hardening flocking adhesive composition according to the invention may be used as a one-component or as a two-component polyurethane adhesive. Where one-component compositions are used, they are hardened by moisture diffusing into the adhesive composition from the surrounding atmosphere or from fibers with which the composition comes in contact. Some of the free NCO groups present react with water to form amines which, through the $NH_2$ groups, then react partly with the residual isocyanate groups to form polyureas and partly with the free epoxy compounds present. Adhesion and stability to weather influences, particularly water, can be distinctly improved through this hardening mechanism.

The adhesives may also be hardened by the addition of a hardener component such as a polyfunctional alcohol or a polyfunctional amine. Other suitable hardeners are polyesters, polyethers or polyamides containing terminal OH or NH$_2$ groups.

The diisocyanates which may be used for the preparation of the polyurethane prepolymers are commercially available materials which may be used in pure form or in the form of their technical mixtures.

The viscosity of the polyurethane prepolymers may be adjusted through the mixing ratio of difunctional polyols having a number average molecular weight of 400 to 1000 and those having a number average molecular weight of more than 1000 up to 4000. Preferably, the higher molecular weight polyol component has a number average molecular weight of 1250 to 4000. A suitable polyol with a molecular weight between 400 to 1000 is castor oil. Polybutadiene polyols, polyesterols, polytetrahydrofurans, polycaprolactones, polypropylene glycols, and polyethylene glycols, in each case with a degree of polymerization to yield a molecular weights within the range of 400–1000 are also suitable. With a higher degree of polymerization, sufficient to yield a molecular weight more than 1000, polybutadiene polyols, polyesterols, polytetrahydrofurans, polycaprolactones, polypropylene glycols, and polyethylene glycols are all also suitable for the polyol component with a number average molecular weight more than 1000 up to 4000. Preferred polyols are polypropylene glycols. The preferred mixing ratio of the lower and higher molecular weight polyols ranges from 1.0 to 0.5 up to 1.0 to 5.0 moles respectfully.

As indicated above, the moisture-hardening flocking adhesive composition of the invention contains one or more aromatic dinitroso compounds as adhesion promoters in quantities of from 1 to 5 parts by weight and preferably in quantities of from 1.5 to 2.5 parts by weight. It is preferred to use 1,4-dinitrosobenzene in pure form or in the form of commercially available technical mixtures predominantly containing this compound. Other suitable dinitroso compounds are m-dinitrosobenzene, m-dinitrosonaphthalene, p-dinitrosonaphthalene, 2,5-dinitroso-p-cymol, 2-methyl-1,4-dinitrosobenzene, 2-methyl-5-chloro-1, 4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene.

The polyfunctional, hydroxyl-free epoxy resins suitable for use in accordance with this invention having epoxide values of 0.45 to 0.75 and which are selected from the group consisting of reaction products of epichlorohydrin with novolaks or bisphenols, differ from those according to US Patent 4,535,121 in the fact that the latter contain free hydroxyl groups. U.S. Pat. No. 4,535,121 discloses the use of diglycidyl ethers of epichlorohydrin and bisphenol A. The hydroxy-free epoxy resins used in accordance with this invention having hydroxyl values (equivalents OH per 100 g resin) of less than 0.01 provide the flocking adhesive composition with a low viscosity which is retained even after prolonged storage. The hydroxyl-free epoxy resins are commercially available compounds. Reaction products of epichlorohydrin with bisphenol A or F, or with novolaks are preferred.

Since the polyurethane prepolymer composition used in accordance with this invention has a viscosity in the range of rom 600 to 900 mPa.s at 20° C. (1 Pascal second —Pa.s—approximates 1 centipoise second—cps), it may be applied directly to the substrate to be flocked by rollers, by casting or by brushing techniques. However, lower viscosities may also be desirable such as where the adhesive composition is to be applied by spraying. In such a case, 1 to 20 parts by weight of at least one alkylbenzene corresponding to the formula $C_6H_5$—$C_nH_{2n+1}$, where n has a value of 8 to 6, may be added to the adhesive composition of the invention. Commercially available technical alkylbenzene mixtures in which the alkyl substituent contains 10 to 14 carbon atoms are preferred. These alkylbenzenes function as a plasticizer and enable the viscosity of the composition to be adjusted to a value of 40 to 500 mPa.s at 20° C.

By virtue of the absence of solvents, the moisture-hardening flocking adhesive composition of the invention has a relatively high flash point generally above 110° C.

The moisture-hardening flocking adhesive composition according to the invention is essentially free of catalysts which catalyze the reaction of NCO groups with epoxy groups to form oxazolidone groups. Such catalysts include the alkali phenolates, acetates, lactates, naphthenates and alcoholates and also alkali salts of fatty acids such as lithium stearate. However, the moisture-hardening flocking adhesive composition according to this invention may contain catalysts which catalyze the reaction of the free NCO groups with water, for example, organometallic compounds of tetravalent tin such as dibutyltin dilurate, or tertiary amines. Unvulcanized elastomers may be flocked with the moisture-hardening flocking adhesive composition of this invention. Such elastomers are generally formulated with standard additives such as fatty acids, oxides of magnesium, calcium or zinc, vulcanization accelerators, vulcanization auxiliaries, stabilizers, solvents, fillers and the like. Unvulcanized articles are brought into the required shape and coated with the flocking adhesive composition of this invention. The fibers are then applied in an electrostatic field as is known in the art. After reaching an initial strength, the articles are then vulcanized in the usual way, i.e. for from 5 to 60 minutes at temperatures in the range of from 120 to 180° C., the flocking adhesive composition hardening during the vulcanization process.

Vulcanized elastomers such as rubber sheets may also be coated with the adhesive composition of this invention. The composition may be applied by spray or brush coating, after which fibers are applied in an electrostatic filed and the composition subsequently hardened for 1 to 5 minutes at temperatures in the range of 100 to 180° C.

Elastomers of various types and origins may be flocked before or after vulcanization using the adhesive composition of this invention. Examples of such elastomers include natural rubber and also polar rubber such as nitrile rubber, chlorobutadiene and chlorinated isoprene, butyl rubber, elastomers based on styrene/butadiene or styrene/isoprene. However, apolar elastomers such as those based on terpolymers of ethylene, propylene and diene monomers, for example diethylidene norbornene, are preferred for flocking. Such elastomers have good weathering properties and are commercially available. They are generally known collectively as EPDM elastomers.

The choice of the fibers which can be applied by means of the adhesives of the invention to the elastomers or even to other flexible substrates such as, for example, to polyethylene or polypropylene films or other films is not critical. Thus, polyester fibers, such as for example polyethylene glycol terephthalate, polyamide fibers such as, for example, nylon-6 or nylon 6.6 polyurethane fibers, rayon, cotton and/or cellulose fibers can be used for flocking. Staple fibers having an average length of from about 0.2 mm to about 2 m are preferably used.

The invention may be illustrated by the following Examples.

EXAMPLE 1

A. Preparation of a prepolymer 1 mol of a polypropylene glycol having a number average molecular weight of 1000 (PPG 1025) and 2.5 mol of a polypropylene glycol having a number average molecular weight of 2000 (PPG 2025) together with 24 mol diphenylmethane diisocyanate were heated to 90° C. in a three-necked flask equipped with a reflux condenser, thermometer and stirrer. 0.5% by weight of a standard catalyst (Dabco) was then added. The temperature rose to 100° C. After the heating had been discontinued, the temperature dropped. To evaluate the completeness of the reaction, an NCO determination was carried out.

B. Preparation of the flocking adhesive.

83.4% by weight of the prepolymer obtained in step A was mixed while stirring with 10% by weight of a commercial $C_{10}$–$C_{14}$ alkylbenzene, 1.6% by weight of a powder-form 1,4-dinitrosobenzene (technical grade) and 5.0% by weight of an epoxy resin based on epichlorohydrin and novolak having a hydroxyl value (equivalents OH per 100 g resin) of 0 and an epoxide value (equivalents epoxide per 100 g resin) of 0.56.

EXAMPLE 2

The procedure of Example 1 was repeated, except that the epoxy resin used in Example 1 was replaced by 5.0% by weight of an epoxy resin based on epichlorohydrin and bisphenol A (bisphenol A diglycidyl ether; DGEBA) having a hydroxyl value of 0 and an epoxide value of 0.56.

COMPARISON EXAMPLE 3

The procedure of Example 1 was repeated, except that no epoxy resin was added to the composition.

COMPARISON EXAMPLE 4

The procedure of Example 1, was repeated, except that the hydroxyl-free epoxy resin was replaced by a hydroxyl-containing epoxy resin based on epichlorohydrin and bis-phenol A having an epoxide value of 0.200 to 0.225 and a hydroxy value of 0.29.

COMPARISON EXAMPLE 5

The procedure of Example I, was repeated, except that the hydroxy-free epoxy resin used in Example I was replaced by an epoxy resin containing epoxy groups and having an epoxide value of 0.21 and a hydroxyl value of 0.04.

The flocking adhesives prepared in the Examples were tested for storage stability (2 weeks at 40° C.), and were also tested for strength of adhesion to an EPDM rubber after storage for 5 days in water at 80° C. This test was carried out as follows:

The test substrates used were vulcanized EPDM rubber sheets having the following composition:

| EPDM | |
|---|---|
| Ethylene-propylene terpolymer rubber | 100.0 parts |
| Stearic acid | 1.0 parts |
| ZnO | 5.0 parts |
| Carbon black | 100.0 parts |
| CaO | 10.0 parts |
| Chalk (surface treated with stearic acid) | 50.0 parts |
| Zinc mercaptobenzthiazole | 1.2 parts |
| Zinc ethyl phenyl dithiocarbamate | 3.0 parts |
| Dipentamethyl thiuram tetrasulfide | 2.0 parts |
| Sulphur | 0.4 parts |
| Vulcanization conditions: 160° C./10 mins. | |

The surfaces of EPDM substrate sheets prepared as described above were cleaned by washing with xylene, spread coated with the flocking adhesive mixtures and then electrostatically flocked. 0.75 mm long polyester staple fibers were used as the flocks. The flocking adhesive was dried for 5 minutes at 180° C.

The flocked sheets were stored in water for 5 days at 80° C. The peel strength was then determined. To this end, 1 by 15 cm strips were cut from the sheets. A 1 cm thick, 7 cm long layer of sealing wax was poured over the flocked layer and cooled. The layer of sealing wax was peeled off from the flocked substrate using a roller at an angle of 90°.

The measured viscosity and adhesive strength values are shown in Table 1 below.

TABLE 1

| | Viscosity and Adhesive Strength On EPDM After Storage In Water | |
|---|---|---|
| Example | Viscosity (2 weeks, 40° C.; mPa.s) | Adhesive Strength (5 days, 80° C.; N/mm) |
| 1 | 350 | 8 |
| 2 | 370 | 8 |
| 3 | 350 | 3 |
| 4 | 10,000 | 8* |
| 5 | 2,000 | 8* |

*only freshly prepared products

It can be seen that the flocking adhesive compositions of the invention of Examples 1 and 2 show improved stability after storage compared with the flocking adhesive compositions of Comparison Examples 4 and 5; only the flocking adhesive composition of Comparison Example 3, which contains no epoxy resin, shows a viscosity comparable with that of Examples 1 and 2. Strength of adhesion after storage in water is the same in Examples 1 and 2 and in Comparison Examples 4 and 5 (providing the latter are used immediately after preparation), but considerably worse in the case of Comparison Example 3 where no epoxy resin was used. However, the adhesive strength of the flocking adhesive composition of Comparison Examples 4 and 5 also deteriorates with increased storage time.

It is to be understood that the above described embodiments of the invention are illustrative only and that modifications throughout may occur to those skilled in the art.

We claim:
1. An adhesive composition comprising:
   (a) at least one isocyanate terminated polyurethane prepolymer, said prepolymer consisting essentially of the reaction product of a diisocyanate component selected from the group consisting of diphenylmethane diisocyanate, hydrogenated diphenylmethane diisocyanate, tolyene diisocyanate, hexamethylene diisocyanate, and mixtures thereof with a mixture of difunctional polyols, one of said polyols having a number average molecular weight of from about 400 up to 1000, and another of said polyols having a number average molecular weight of from more than 1000 up to about 4000;
(b) at least one aromatic dinitroso compound present in an amount sufficient to promote adhesion of the composition to an elastomeric substrate;
(c) at least one epoxy resin having an epoxide value of from about 0.45 to about 0.75 and a hydroxide value of less than about 0.01; and
(d) at least one alkyl benzene having the formula $C_6H_5-C_nH_{2n+1}$, where n is an integer having a value of 8 to 16, said adhesive composition being essentially free of catalysts which catalyze the reaction of NCO groups with epoxy groups to form oxazolidone groups.

2. The composition of claim 1 wherein said alkylbenzene is present in amount sufficient such that the viscosity of the composition is within the range of about 40 to about 500 mPa.s at 20° C.

3. The composition of claim 2 wherein said akylbenzene is a $C_{10}$ to $C_{14}$ alkyl-substituted benzene.

4. A moisture hardening adhesive composition for use in the electrostatic flocking of flexible substrates, comprising:
(a) from about 80 to about 96 parts by weight of a polyurethane prepolymer consisting essentially of the reaction product of a diisocyanate component selected from the group consisting of diphenylmethane diisocyanate, hydrogenated diphenylmethane diisocyanate, tolyene diisocyanate, hexamethylene diisocyanate, and mixtures thereof with a mixture of difunctional polyols, one of said polyols having a number average molecular weight of from about 400 up to 1000, and another of said polyols having a number average molecular weight of from more than 1000 up to about 4000;
(b) from about 1 to about 5 parts by weight of at least one aromatic dinitroso compound;
(c) from about 3 to about 10 parts by weight of at least one epoxy resin having an epoxide value of from about 0.45 to about 0.75 and a hydroxide value of less than about 0.01, selected from the group consisting of reaction products of epichlorhydrin with a novolak or a bisphenol; and
(d) 0 to abut 20 parts by weight of at least one alkyl benzene having the formula $C_6H_5-C_nH_{2n+1}$, wherein n is an integer having a value of 8 to 16, parts by weight being based on a composition having 100 parts by weight, said moisture hardening adhesive composition being essentially free of catalysts which catalyze the reaction of NCO groups with epoxy groups to form oxazolidone groups.

5. The composition of claim 4 wherein said prepolymer has a viscosity in the range of from about 600 to about 900 mPa.s at 20° C.

6. The composition of claim 5 wherein said polyols are selected from the group consisting of polyethylene glycol, polypropylene glycol, polytetrahydrofuran, polycaprolactone, polyesterols, castor oil, polybutadiene polyol, and mixtures thereof.

7. The composition of claim 6 wherein said polyols are polypropylene glycols.

8. The composition of claim 7 wherein said higher molecular weight polyol has a number average molecular weight of from about 1250 to about 4000.

9. The composition of claim 4 wherein said epoxy resin is the reaction product of epichlorohydrin with a member selected from the group consisting of bisphenol A, bisphenol F and a novolak.

10. The composition of claim 4 containing at least 1 part by weight of said alkylbenzene.

11. The composition of claim 10 having a viscosity in the range of from about 40 to about 400 mPa.s at 20° C.

12. The composition of claim 11 wherein said alkylbenzene is a $C_{10}$ to $C_{14}$ alkyl substituted benzene.

13. The composition of claim 4 containing from about 1 to about 2 parts by weight of said aromatic dinitroso compound.

14. The composition of claim 4 having a flash point in excess of about 110° C.

15. The composition of claim 4 wherein said diisocyanate is diphenylmethane diisocyanate.

16. The composition of claim 4 which additionally contains catalytic quantities of a catalyst which catalyzes the reaction of NCO groups with water.

17. The composition of claim 4 which is free of organic solvent.

* * * * *